United States Patent
Famos

(10) Patent No.: US 7,036,789 B2
(45) Date of Patent: May 2, 2006

(54) DISTRIBUTION VALVE COMPRISING A FLOWMETER FOR INSTALLING IN AN INLET

(75) Inventor: Toni Famos, Widen (CH)

(73) Assignee: Ostaco AG, (CH)

( * ) Notice: Subject to any disclaimer, the term of this patent is extended or adjusted under 35 U.S.C. 154(b) by 0 days.

(21) Appl. No.: 10/512,108

(22) PCT Filed: Apr. 22, 2002

(86) PCT No.: PCT/IB02/01382

§ 371 (c)(1),
(2), (4) Date: Dec. 9, 2004

(87) PCT Pub. No.: WO03/089844

PCT Pub. Date: Oct. 30, 2003

(65) Prior Publication Data

US 2005/0092103 A1 May 5, 2005

(51) Int. Cl.
*F16K 51/00* (2006.01)

(52) U.S. Cl. ................ 251/121; 137/553; 137/559
(58) Field of Classification Search ........... 251/121; 137/553, 559
See application file for complete search history.

(56) References Cited

U.S. PATENT DOCUMENTS

| | | | | |
|---|---|---|---|---|
| 2,642,254 A | * | 6/1953 | Armstrong | 251/118 |
| 2,891,570 A | * | 6/1959 | Krupp | 137/559 |
| 4,417,601 A | * | 11/1983 | Bennett | 251/122 |
| 5,464,039 A | * | 11/1995 | Bergamini | 137/551 |
| 6,325,098 B1 | | 12/2001 | Motta et al. | 137/551 |

FOREIGN PATENT DOCUMENTS

| | | |
|---|---|---|
| DE | 3 509 718 | 9/1986 |
| DE | 94 04 156 U1 | 5/1994 |
| DE | 44 02 752 | 8/1995 |
| DE | 44 02 752 A1 | 8/1995 |
| DE | 196 08 780 | 9/1996 |
| DE | 196 08 780 A1 | 9/1996 |
| DE | 298 06 215 | 7/1999 |
| DE | 298 06 215 U1 | 9/1999 |
| DE | 100 38 874 | 8/2001 |
| DE | 100 38 874 A1 | 8/2001 |
| WO | WO 95/20733 | 8/1995 |

OTHER PUBLICATIONS

International Search Report dated Dec. 16, 2002.

* cited by examiner

*Primary Examiner*—John Bastianelli
(74) *Attorney, Agent, or Firm*—Ostrolenk, Faber, Gerb & Soffen, LLP

(57) ABSTRACT

A distribution valve having a flowmeter for use in a flow pipe of a hot water heating circuit. The distribution valve has a branch line and an adjusting and measuring unit for adjusting and displaying the flow rate through the branch line with the elements being screwed into opposing threaded holes of the distribution line. The valve gap determines the flow rate through the branch line formed between a closing body and a valve seat body with the valve seat body being configured from a fixed housing section of the adjusting and measuring unit. The flow is measured with an inflow member that is displaced by fluidic forces against a spring force in a flow canal.

50 Claims, 9 Drawing Sheets

DISTRIBUTION VALVE COMPRISING A FLOWMETER FOR INSTALLING IN AN INLET

CROSS REFERENCE TO RELATED APPLICATION

The present application is a 35 U.S.C. § 371 national phase conversion of PCT/IB02/01382 filed Apr. 22, 2002, which was published in the German language.

TECHNICAL FIELD

The invention relates to distribution valves with flow meter, a distribution arrangement with such distribution valves, as well as an adjusting and measuring unit for such distribution valves in accordance with the introductory clauses of the independent claims.

PRIOR ART

Distribution valves with flow meters preferably are applied where the flow of a medium through a pipe conduit system must be set to a predetermined value over a prolonged time and shall, thereby, lend itself for a permanent and direct reading. Especially in the field of the domestic technique, such distribution valves find increasingly application for the setting of the flow of warm water through individual warm water heating circuits. A plurality of distribution valves for a respective number of heating circuits is, thereby, preferably established in that a distributor conduit, which serves as a common housing and as common inflow conduit for the distribution valves, is equipped with a corresponding number of valve units. These consist each of a branch line for the connection to the inlet of the heating circuit and of an adjusting and measuring unit for the adjusting and displaying of the flow through the branch line, which are screwed into tapped bores in the distributor conduit located directly opposite to each other. The adjustable valve gap for the adjusting of the flow rate through the branch line is established, thereby, between a valve closing body formed by the adjusting and measuring unit, which is operatively connected to a adjusting spindle of this unit, and a stationary valve seat body, and especially in such manner that by a rotating of the adjusting spindle a hood shaped valve closing body is slid axially over the free end of the branch line facing the adjusting and measuring unit or, however, in such a menner that a cylinder shaped valve closing body, through which medium flowing out of the valve gap at its inside flows, is slid in a direction facing away from the branch line into a conical bore in a structural member of the adjusting and measuring unit. In order to measure and display the flow rate through the branch line, the adjusting and measuring unit comprises a flow against member connected to a display rod, which is arranged in a central flow channel and is displaceable together with the display rod by the flow in the flow channel against a spring force, wherewith a reading of the flow rate through the branch line is possible at the display rod. Between the exit out of the valve gap and the impinging onto the flow against member, the flow is deflected typically once by 90° to 180°.

The practice has revealed that the presently known distribution valves with flow rate meters foreseen for the mounting in the inlet are not suitable as shut-off valves, because they are often assembled only directly before the installation of separately produced branch lines, flow pipe distribution lines and adjusting and measuring units sourced from different manufactures, so that the shape and position tolerances of the completed valves, which are indispensable for their leak tightness when used as shut-off valves, can hardly be ensured. It has, additionally, been evidenced that with the presently known distribution valves with flow meter suitable for the use in the inflow conduit, a precise reading of the flow rate is practically impossible because the display is relatively fluctuating also at stable conditions of operation.

DISCLOSURE OF THE INVENTION

Thus, there is the object to provide distribution valves with flow meter, a distribution arrangement with such distribution valves as well as an adjusting and measuring unit for such distribution valves, which do not have the drawbacks of the prior art or eliminate them at least partly.

This object is met by the distribution valves and the adjusting and measuring unit for such a distribution valve in accordance with the characterizing features of the independent claims.

A first aspect of the invention refers to a distribution valve with flow meter, which is mounted preferably in the inlet conduit of a warm water heating circuit. The distribution valve comprises a housing, which forms simultaneously the inlet conduit, a branch line, which extends from the housing and through which the medium coming from the inlet and flowing through the valve leaves the distribution valve, as well as an adjusting and measuring unit for the adjusting and the display of the flow rate of the medium through the branch line. The adjusting and measuring unit is made separately from the housing and is arranged at the housing in such a manner, that it penetrates the wall of the housing directly opposite the branch line. It includes a valve closing body and an adjusting spindle, to which the valve closing body is operationally connected in such a manner that it forms, together with a valve seat body which during conventional operation is stationary relative to the housing, a valve gap, which is adjustable by a rotating of the adjusting spindle for the adjusting of the flow rate through the branch line. The adjusting and measuring unit also includes a flow against member, which is located in a flow channel through which in operation the complete amount of the medium flowing off through the branch line flows. The flow against member, thereby, is arranged in the flow channel in such a manner and is operatively connected to display means of the adjusting and measuring unit, which can be read from the outside, that its position in the flow channel proceeding from an initial position is adjustable dependent from the flow rate by the flow flowing through the flow channel and that different positions of the flow against member in the flow channel cause different displays of the display means, so that the respective flow rate through the branch line can be read at the outside of the valve. The structural member, which forms together with the valve closing body the adjustable valve gap, is concretely considered as valve seat body. As valve gap the flow cross-section is considered, which in operation basically sets the flow rate through the branch line, thus generally the smallest flow cross-section.

In accordance with the invention, the distribution valve is designed in such a manner that the flow exiting the valve gap during conventional operation is deflected, prior to its impinging onto the flow against member, at least twice, preferably in each case by at least 45°, still more preferred in each case by about 90°, namely initially in a first sense of rotation into a first direction and thereafter in a second sense of rotation opposed to the first sense of rotation into a second direction. By means of this, a S-shaped flow path from the valve gap to the flow against member results. Surprisingly it has been evidenced that this causes an especially flutter-free display of the flow rate, which leads, in comparison with the prior art, to a clear improvement of the reading precision.

A second aspect of the invention refers also to a distribution valve with flow meter, preferably in accordance with the first aspect of the invention, which is mounted preferably in the inlet of a warm water heating circuit. The distribution valve includes also here a housing which simultaneously forms the inlet, a branch line, which extends away from the housing and through which the medium, coming from the inlet conduit and flowing through the valve, leaves the distribution valve, as well as an adjusting and measuring unit for adjusting and displaying of the flow rate of the medium through the branch line. The adjusting and measuring unit is also formed separately from the housing and is arranged in such a manner at the housing that it penetrates the wall of the housing directly opposite the branch line. It includes also a valve closing body and an adjusting spindle, to which the valve closing body is operatively connected in such a manner that it forms together with a valve seat body, which during conventional operation is stationary relative to the housing, at least one valve gap adjustable by a rotating of the adjusting spindle for an adjusting of the flow rate through the branch line. The adjusting and measuring unit also here comprises a flow against member, which is located in a flow channel through which in operation the total amount of the medium flowing off through the branch line flows. Also here, the flow against member is located in such a manner in the flow channel and is operatively connected with display means of the adjusting and measuring unit, which can be read from the outside, that its position in the flow channel, proceeding from a starting position, is adjustable by the flow flowing through the flow channel in dependency from the flow rate and the different positions of the flow against member in the flow channel cause different displays of the display means. By means of this, a respective flow rate through the branch line can be read at the outside of the valve. Also here, as valve seat body the structural member is concretely considered, which forms together with the valve closing body the adjustable valve gap and as valve gap the flow cross-section is considered, which in operation significantly determines the flow rate through the branch line, thus in general the smallest flow cross-section.

In accordance with the invention, the distribution valve is designed in such a manner that during conventional use a stationary housing portion of the adjusting and measuring unit contacts sealingly, preferably at the face by means of sealing surfaces and/or through a seal, such as e.g. an o-ring, a housing portion of the branch line, which is stationary during conventional use of the distribution valve, so that, in particular at distribution valves in which the valve seat body is formed by a structural member of the adjusting and measuring unit, a leakage flow from the inflow conduit into the branch line circumnavigating the valve gap is safely prevented. By means of this, distribution valves with flow meter in accordance with the invention can be provided, which due to the proper closing function between the inflow conduit and branch conduit can also be used as shut-off valves.

The distribution valve is, thereby, preferably, additionally designed such, that the structural member, which forms the walls defining the flow channel at the area in which the flow against member can be positioned by the flow during conventional operation, is located at least partly inside of the stationary housing portion of the adjusting and measuring unit, and that a seal is present between this structural member and the stationary housing member of the adjusting and measuring unit, which prevents a forming of a leakage flow from the valve gap to the exit of the branch line circumnavigating the flow channel. This seal can be obtained by a suitable design and suitable tolerances of adjacent parts and/or by means of sealing elements, such as e.g. O-rings. By means of this, distribution valves of the kind mentioned before with an excellent measuring precision can be arrived at.

It is, furthermore, of advantage if the stationary housing portion at the adjusting and measuring unit has radial or semi-axial (i.e. inclined relative to the axis of the adjusting and measuring unit) through openings with preferably circular or square shape, through which the medium can flow from the inflow conduit to the valve gap. A purely radial design allows a low-cost producing of these structural members, the semi-axial design leads to specifically low pressure losses of the flow through the through openings.

According to a further preferred embodiment of the distribution valve according to one of the previously mentioned aspects, the valve is designed in such a manner, that the valve seat body is formed by a structural member of the adjusting and measuring unit. According to a further preferred embodiment of the distribution valve according to one of the previously mentioned aspects, the valve is designed in such a manner, that the walls of the flow channel, in the area where the flow against member can be positioned by the flow during conventional operation, are formed by a structural member of the adjusting and measuring unit. Because the adjusting and measuring unit can be provided as a pre-assembled unit for a distribution valve to be assembled on site, this embodiment leads to the advantage that the desired controlling behavior and/or the desired measuring preciseness of the distribution valve with flow meter formed thereby can be ensured independent from the precision of the production of the housing and of the branch line, so that a clear improvement of the quality is arrived at and at the same time the tolerances for the housing and the branch line can be more generous, which leads to saving of costs.

In still a further preferred embodiment of the distribution valve according to one of the before-mentioned aspects, the structural member, which forms the walls of the flow channel in that area within which the flow against member can be positioned by the flow in the flow channel during conventional operation, projects into the branch line of the distribution valve. In this way, relative compact distribution valves are arrived at, which have a small space requirement and allow the use of pipe shaped distributor conduits with a small diameter as housing. The distribution valve, thereby, is preferably designed in such a manner, for instance by a suitable specifying of the manufacturing tolerance, that a tight connection is present between the structural member, which forms the walls of the flow channel in that area in which the flow against member can be portioned by the flow, and the branch line, so that a circumnavigation of the flow channel and an erroneous measuring of the total flow rate resulting therefrom can be safely avoided.

According to still a further preferred embodiment of the distribution valve according to one of the before mentioned aspects, the distribution valve is designed in such a manner that during conventional operation the medium, which flows from the valve gap to the flow channel, enters the flow channel through a plurality of radial openings in the wall of the flow channel, seen in the direction of flow ahead of the flow against member. It has been revealed that by this measure an improved preciseness of the reading can be arrived at.

Preferably, the radial openings are equally distributed, and by advantage on a common axial position relative to the axis of the flow channel, at the circumference of the flow channel, whereby it is also preferred that all radial openings have an identical cross-section and/or an identical cross-sectional shape. By means of this, a further equalization of the flow in the flow channel and, therewith, a further improvement of the precision of reading is arrived at.

Advantageously exactly two, preferably exactly four radial openings are present, because such openings can be formed especially economically by a radial drilling through the structural member forming the flow channel in this area and lead to a low flow resistance through the distribution valve.

In still a further preferred embodiment of the distribution valve according to one of the before-mentioned aspects, the valve is designed in such a manner that the valve gap is formed by a concentric immersing of a conically shaped body structure of the valve closing body, preferably with the smaller diameter facing against the branch line, into a cylinder shaped or conical bore of the valve seat body, so that the valve gap seen in the direction of flow is a annular gap of which the width of the gap decreases at an increasing immersing of the valve closing body into the bore of the valve seat body until it has a minimal value or equals zero. By means of this, distribution valve with a especially sensitive control behavior can be provided.

In still a further preferred embodiment of the distribution valve in accordance with one of the before-mentioned aspects, the valve is designed in such a manner that the cross-section of the flow channel broadens in the direction of flow in the area where the flow against member can be positioned during conventional operation by the medium flowing therethrough, namely preferably broadens conically or trumped-shaped. Such a design allows a wide range of measurements and simultaneously a high measuring precision at low flow rates.

In still a further preferred embodiment of the distribution valve according to one of the before-mentioned aspects, the adjusting spindle, the valve closing body and the flow channel are formed by a one-piece component, preferably by a one-piece plastic part, which preferably has been produced by injection molding.

In still a further preferred embodiment of the distribution valve according to one of the before-mentioned aspects, the display means comprise a display rod, in particular equipped with a display marking, operated by the flow against member as well as an adjusting member for a manual operating of the adjusting spindle, which completely encloses the outwards directed free end of the display rod and is at least partly transparent and is preferably provided with a scale, in order to allow a reading of the respective position of the display rod relative to the adjusting member and accordingly of the flow rate through the branch line.

Preferably, the adjusting member is additionally rigidly connected to the adjusting spindle, whereby the adjusting spindle and the adjusting member are formed by a one-piece component of a transparent plastic material. By means of this, especially low-cost distribution valves with flow meter can be provided.

A third aspect of the invention refers to a distribution arrangement with two or more distribution valves in accordance with one of the before-mentioned aspects of the invention. In particular when producing a plurality of distribution valves by screwing in of a plurality of adjusting and measuring units into a distributor conduit with a corresponding number of branch lines forming a common housing, the advantages of the invention become clearly visible.

A fourth and last aspect of the invention refers to a adjusting and measuring unit, which leads together with a corresponding housing and a corresponding branch line to a distribution valve or a distribution arrangement according to one of the before-mentioned aspects of the invention.

BRIEF DESCRIPTION OF THE DRAWINGS

Further advantages and applications of the invention arise from the now following description with reference to the drawings, in which there is illustrated in.

MODES FOR CARRYING OUT THE INVENTION

Figure 1:
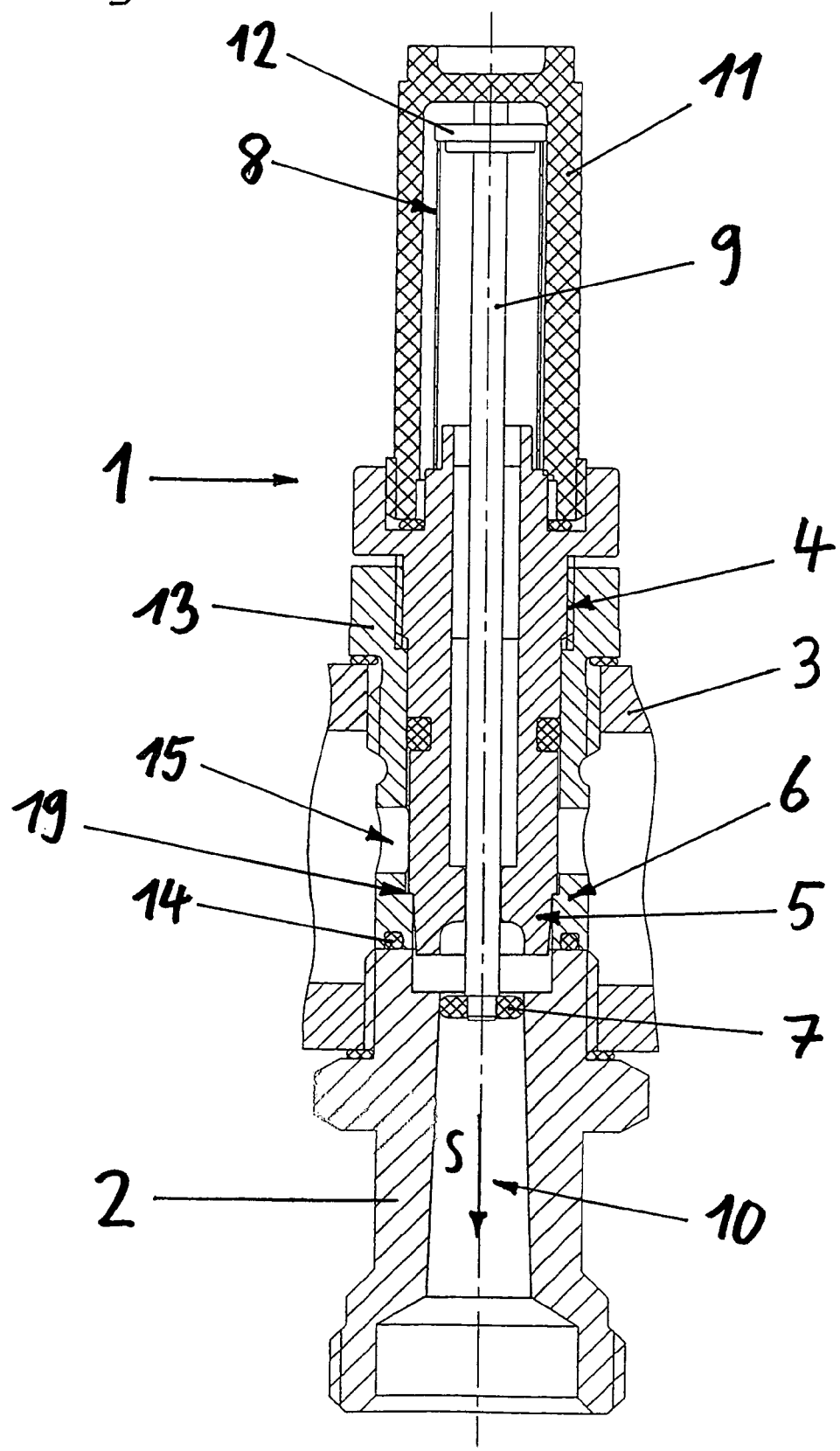
FIG. 1 a section through a first distribution valve with flow meter in accordance with the invention.
Figure 2:
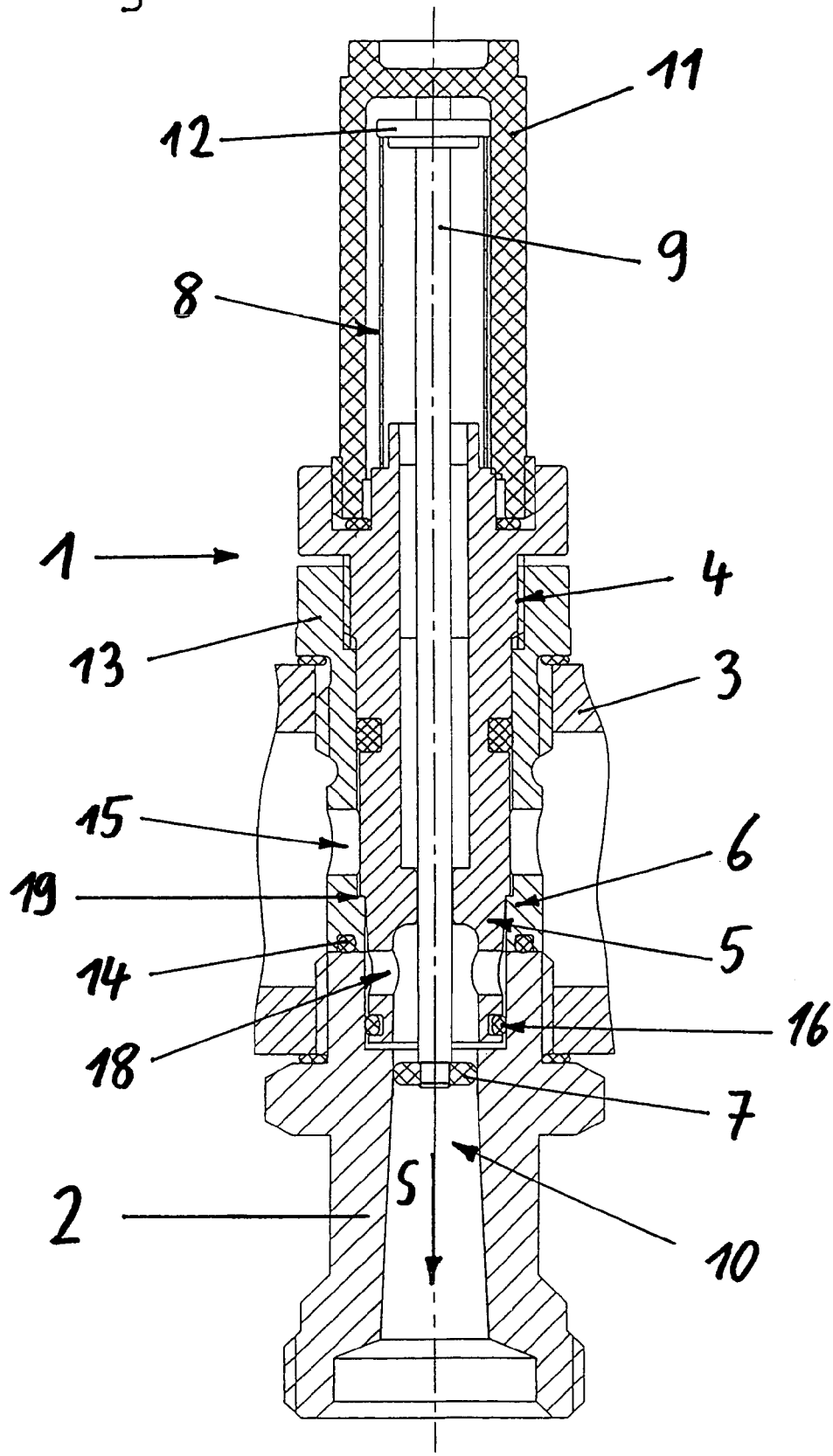
FIG. 2 a section through a second distribution valve with flow meter in accordance with the invention.
Figure 3:
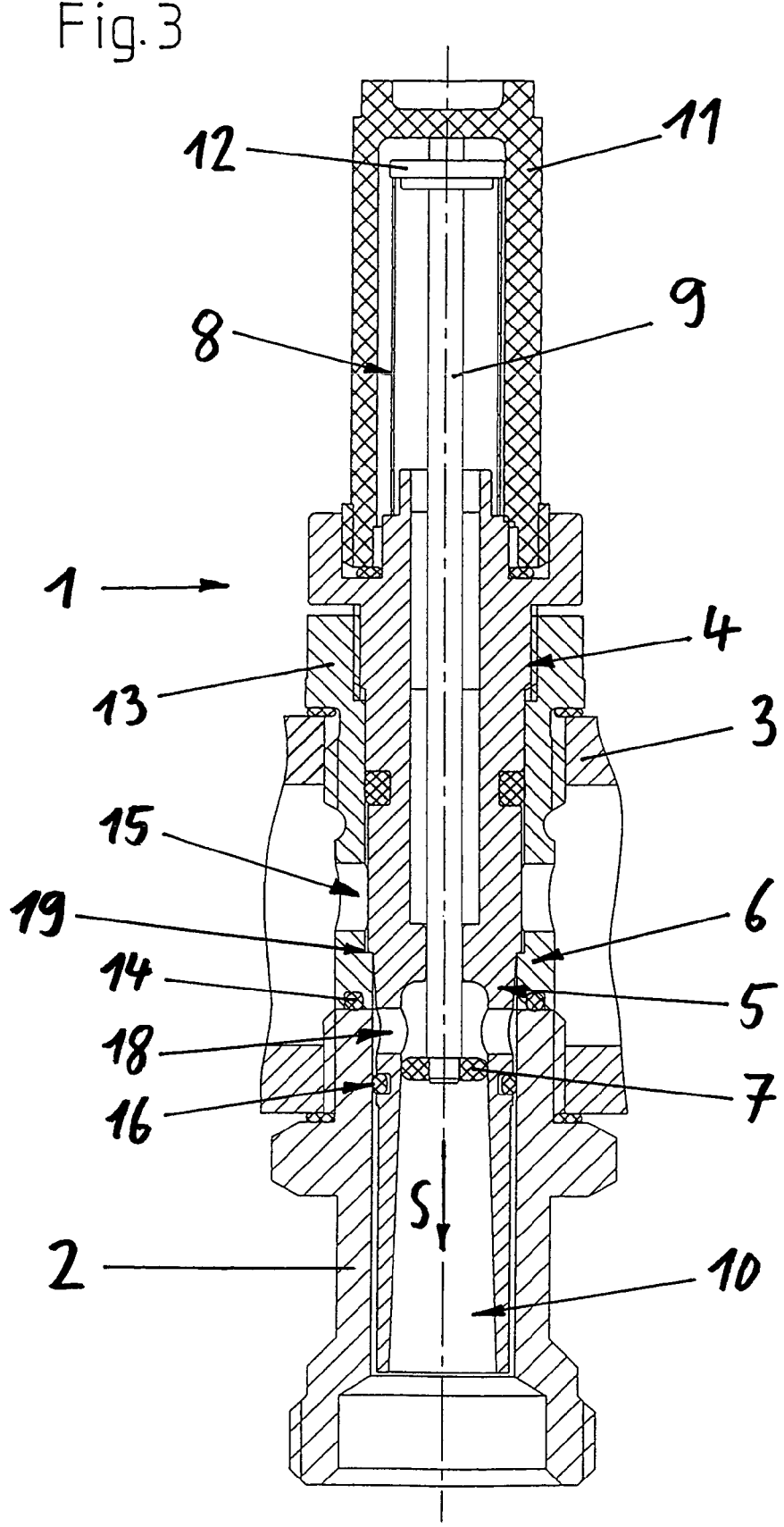
FIG. 3 a section through a third distribution valve with flow meter in accordance with the invention.
Figure 4:
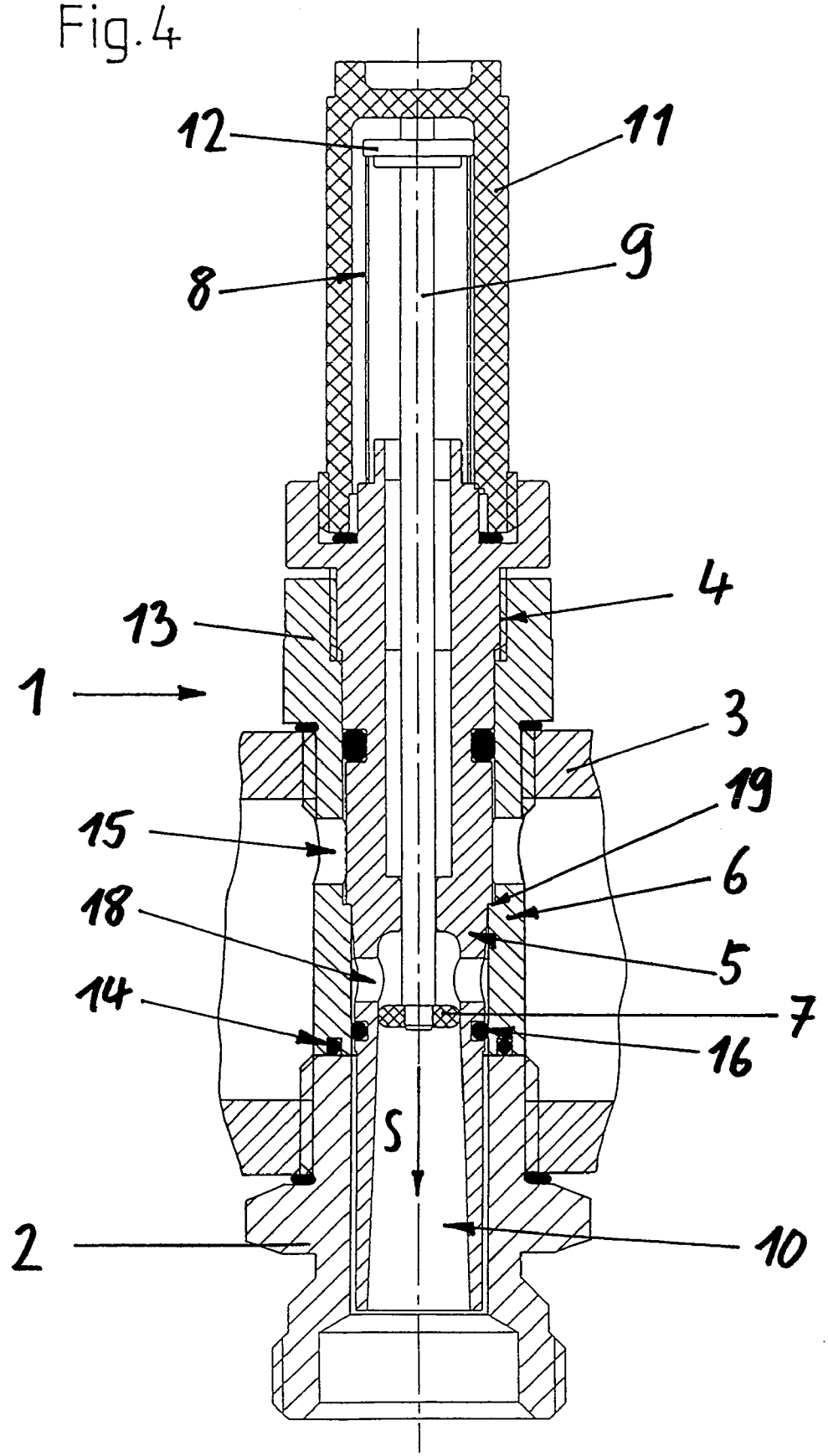
FIG. 4 a section through a forth distribution valve with flow meter in accordance with the invention.
Figure 5:
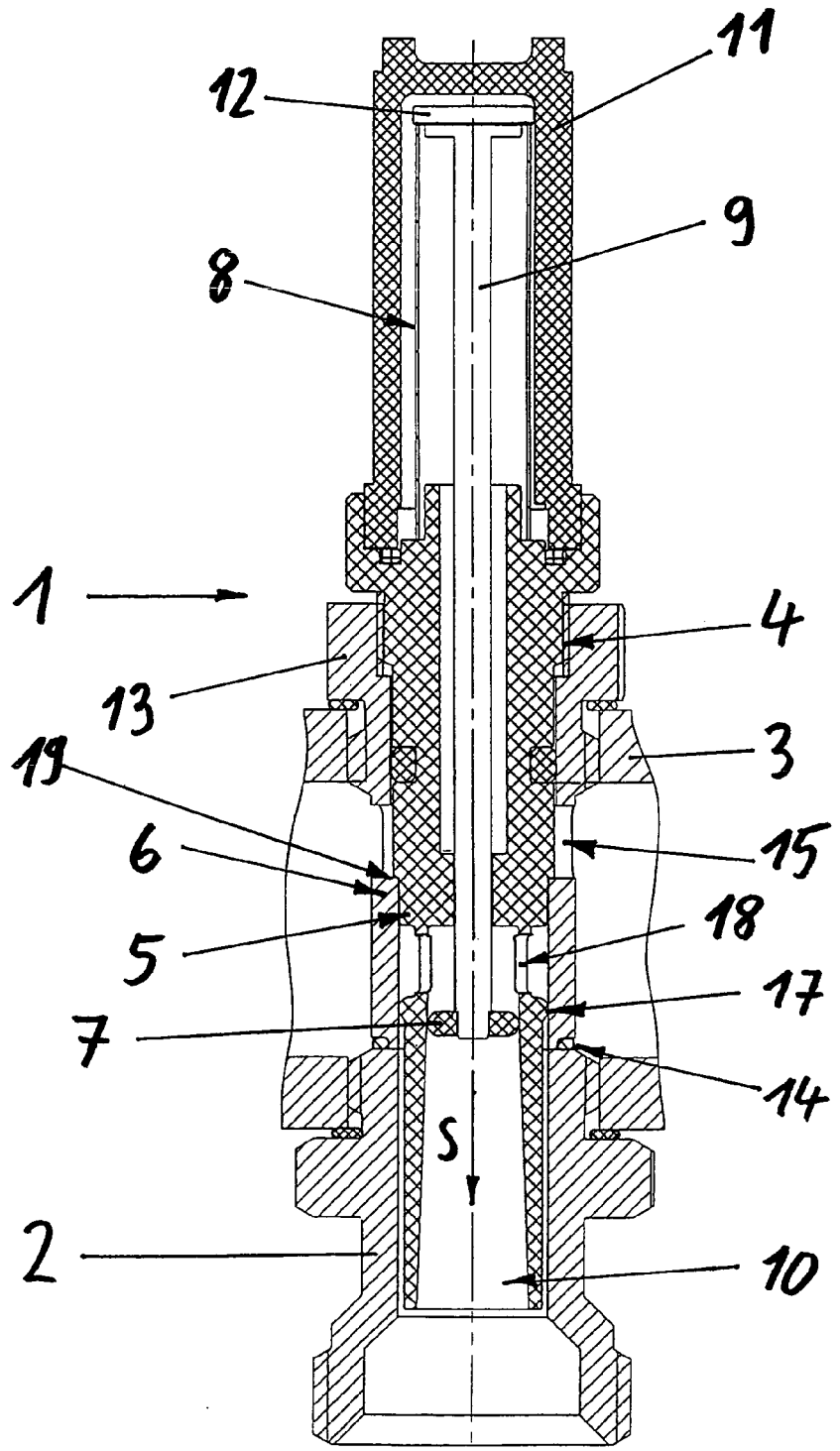
FIG. 5 a section through a fifth distribution valve with flow meter in accordance with the invention.
Figure 6:
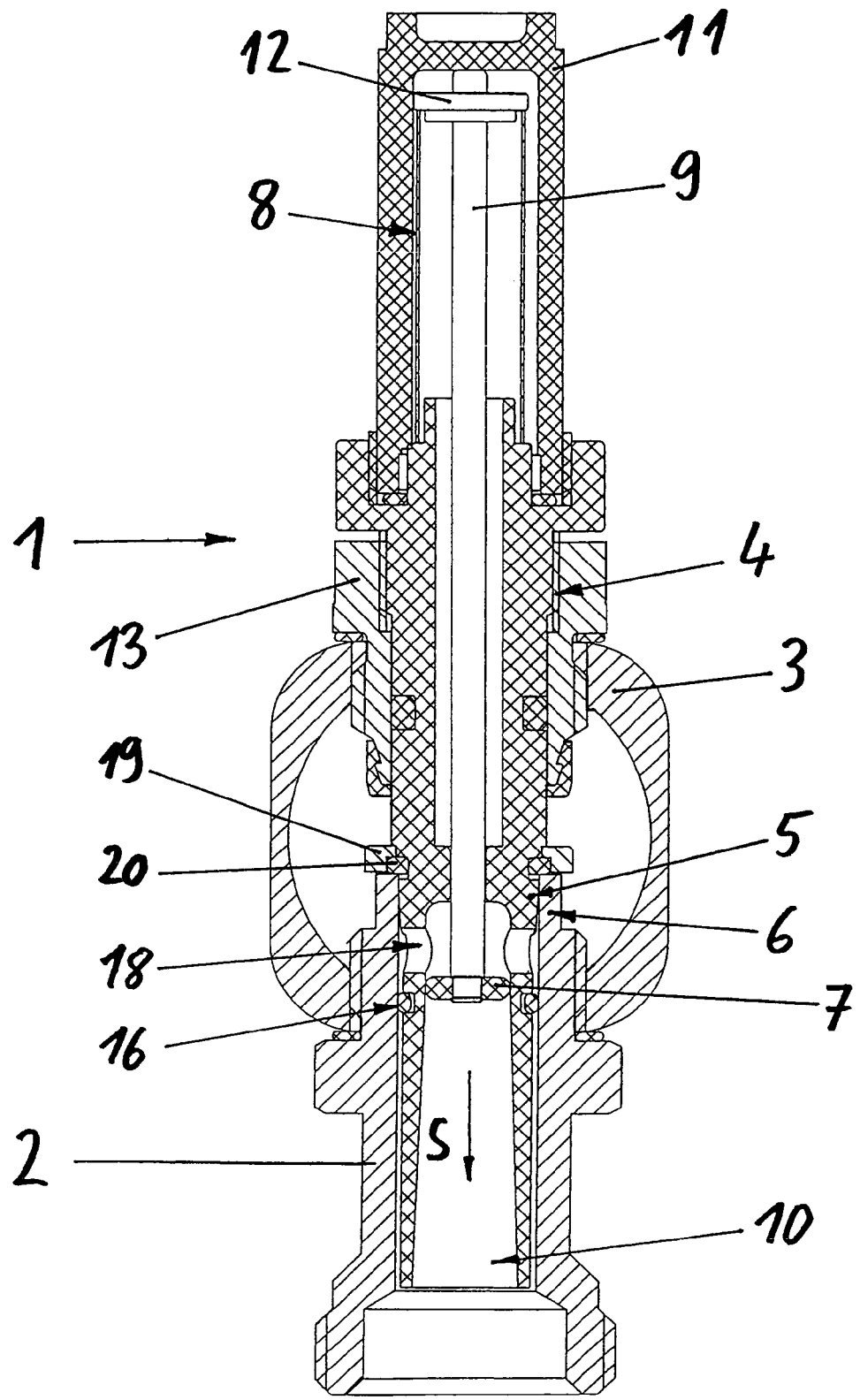
FIG. 6 a section through a sixth distribution valve with flow meter in accordance with the invention.
Figure 6A:
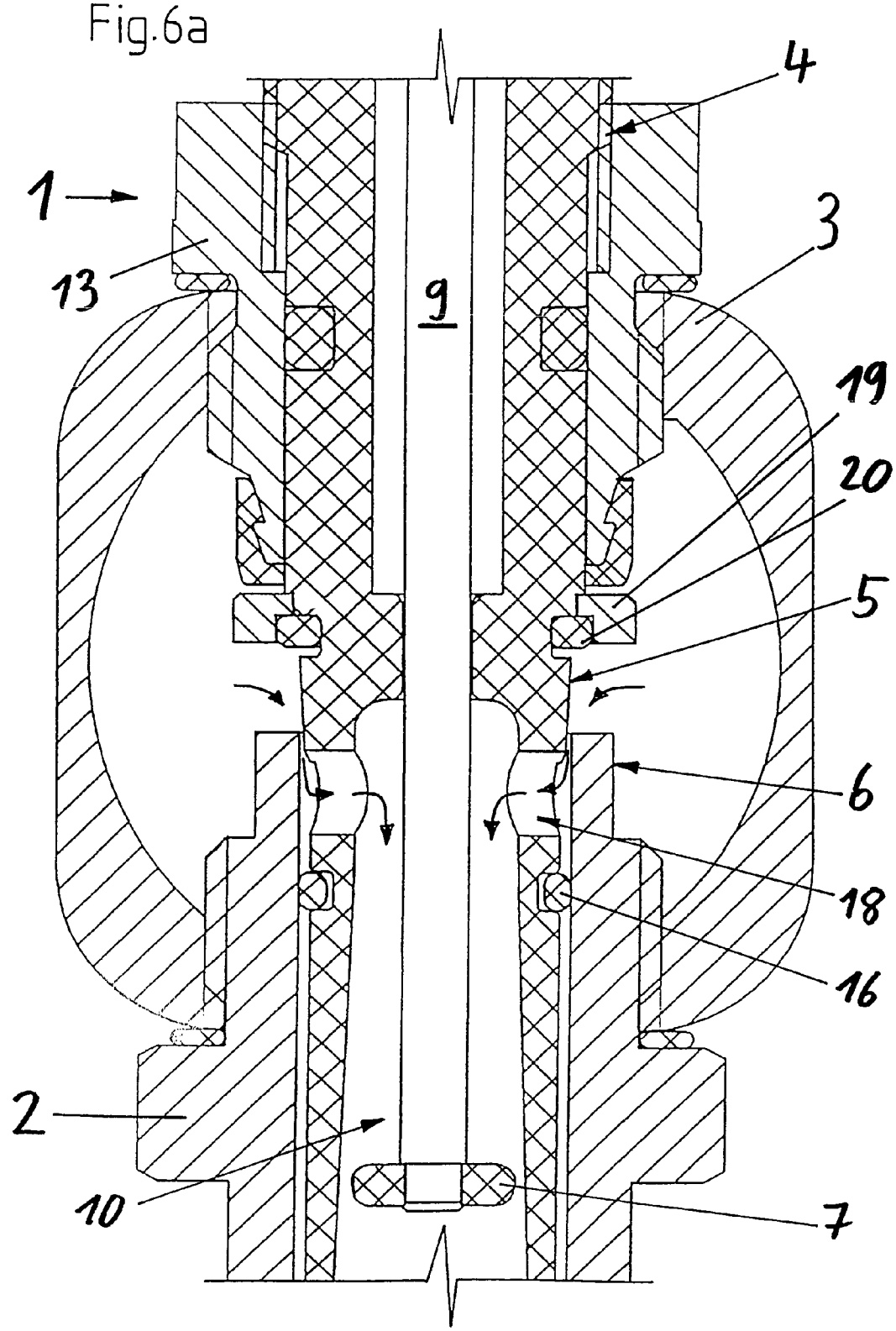
FIG. 6a on an enlarged scale an illustration of the central part of the distribution valve of FIG. 6 in the opened state and in section.
Figure 7:
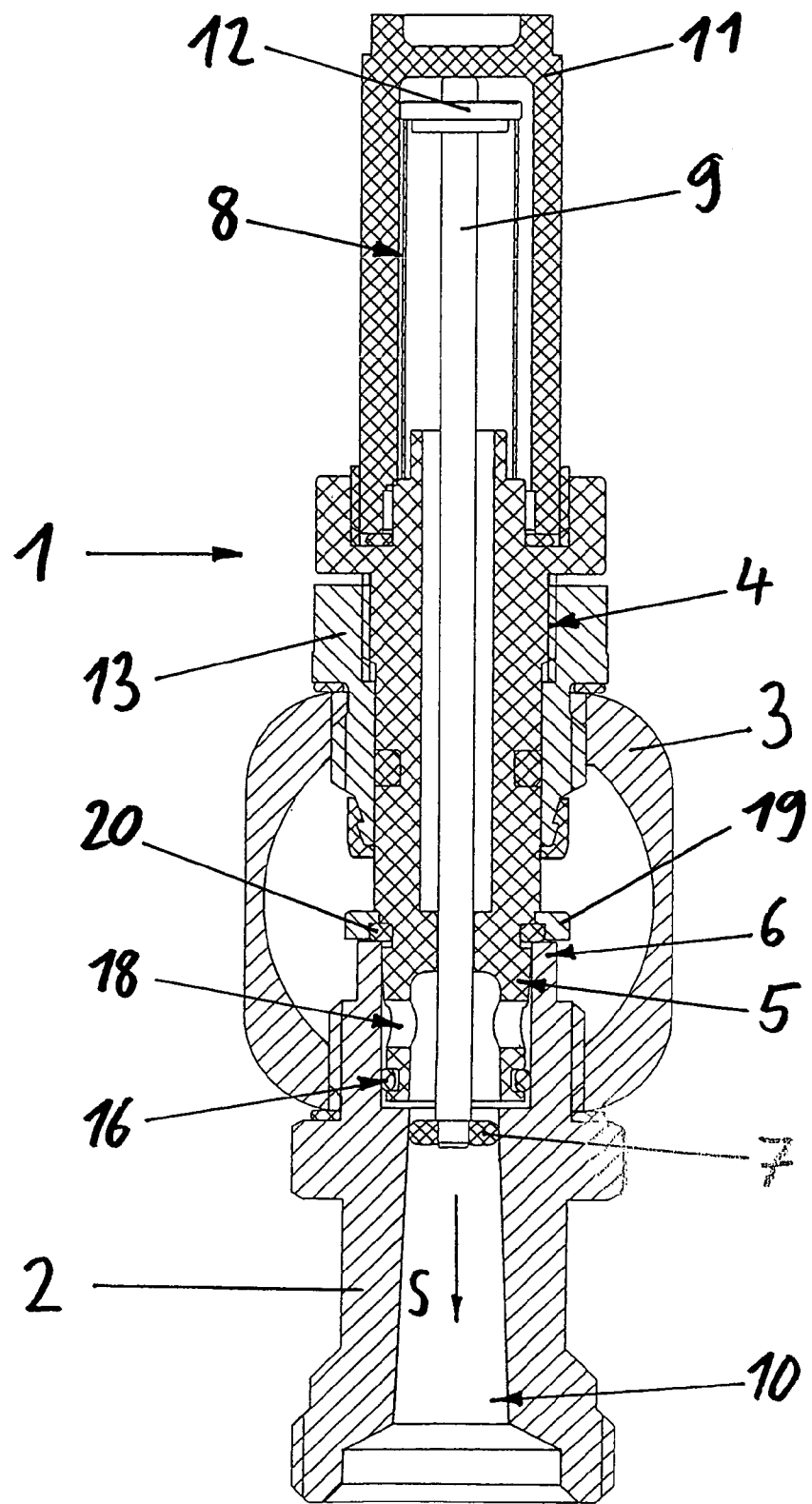
FIG. 7 a section through a seventh distribution valve with flow meter in accordance with the invention.
Figure 8:
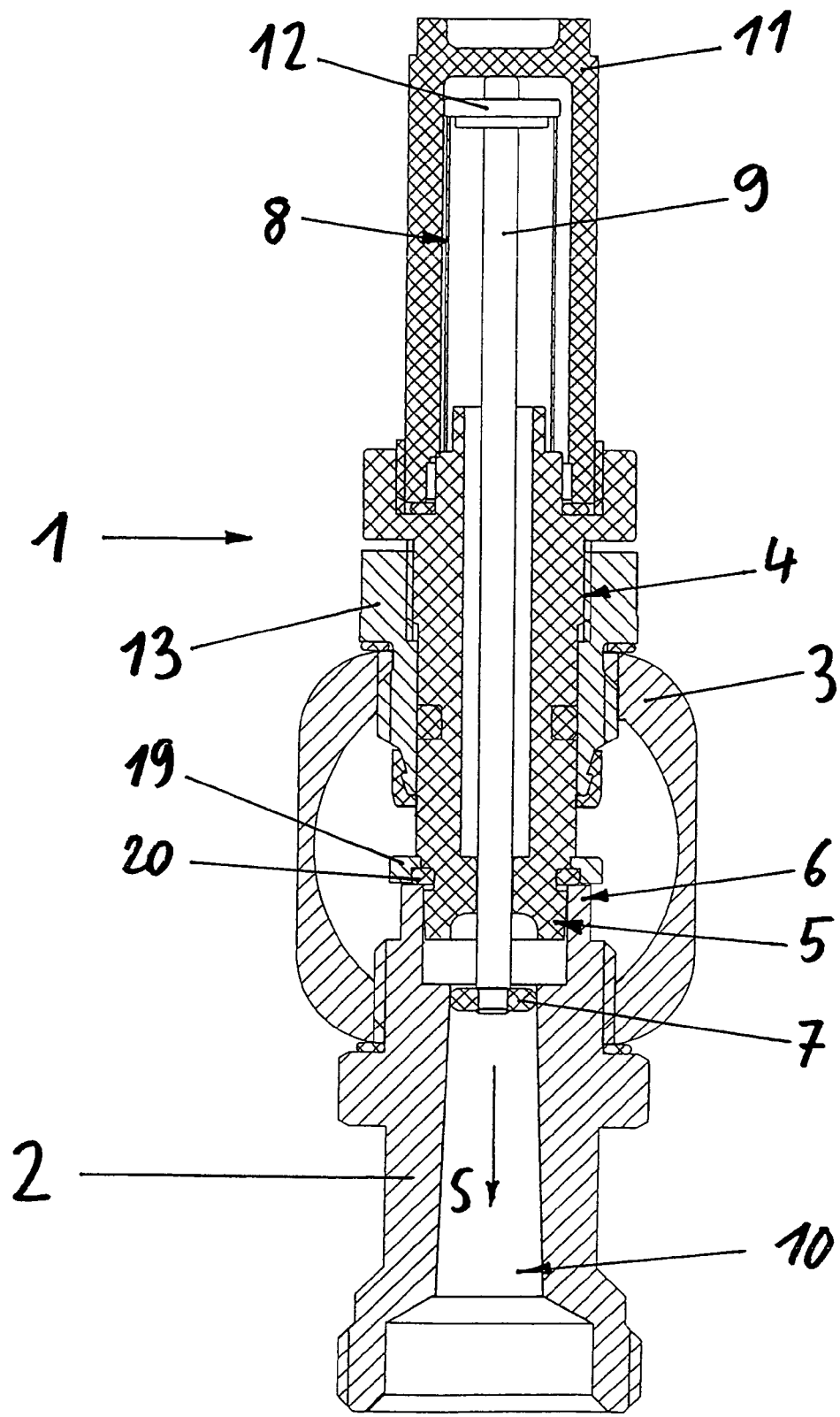
FIG. 8 a section through an eighth distribution valve with flow meter in accordance with the invention.

Various embodiments of the distribution valve unit flow meter in accordance with the invention are illustrated in the FIGS. 1 to 8. Whereas all completely illustrated distribution valves (FIGS. 1–8) are illustrated in a closed state, the partial illustration on a enlarged scale in FIG. 6a illustrates the distribution valve of FIG. 6 in an opened state.

All the illustrated distribution valves have in common that they are foreseen for controlling the amount of flow through a warm water heating circuit and were formed by screwing of an adjusting and measuring unit 1 and a branch line 2 from the outside into two oppositely located tapped bores of an inflow distributor conduit 3, which serves as housing and inflow conduit. The branch line 2, thereby, serves as discharging conduit and is, in the present case, provided at its free end with an outer thread for the connecting to the inflow line of the warm water heating circuit. The adjusting and measuring unit 1 serves for adjusting and displaying of the warm water flow rate through the branch line 2 and includes, at the distribution valves illustrated in the FIGS. 1–8, all structural members with the exception of the branch line 2 and the distributor conduit 3 forming the housing. In all illustrated embodiments, it includes a conical shaped valve closing body 5 supported by an adjusting spindle 4, which forms by a concentric immersing into a cylinder shaped bore in a valve seat body 6, which at conventional operation is stationary relative to the distributor conduit 3, together with this valve seat body 6 a valve gap which is adjustable by a rotating of the valve spindle 4, so that the width of the valve gap decreases at a increasing immersing of the valve closing body 5 into the cylinder-shaped bore of the valve seat body 6 until it reaches a minimal value. The sealing at the completely closed valve occurs at all illustrated distribution valves through an abutment shoulder 19, possibly together with a valve sealing ring 20 (see FIGS. 6–8). Furthermore, the adjusting and measuring unit 1 includes at all illustrated valves a knob shaped flow against member 7, which is located in a conical flow channel 10, through which the entire amount of water, which leaves the distribution valve through the branch line 2, flows. The flow against member 7 is connected to a display rod 9, which is acted upon by a spiral spring 8 with a spring force opposite the direction of flow S through the branch line 7. The flow against member 7, thereby, is arranged in such a manner in the flow channel 10 that it is positioned together with the display rod 9, starting from a initial position in which it is positioned by the display rod 9 which is acted upon by the spring force if no flow through the flow channel 10 occurs, and upon a flow through the flow channel 10 can be displaced dependent from the flow rate against the force of the spring, so that a certain axial position of the flow against member 7 and the display rod 9 in the flow channel 10 corresponds to a certain flow rate through the flow channel 10. The outwards oriented free end of the display rod 9 includes a dish-shaped abutment 12 for the spring 8, which has a color marking at its circumference and accordingly forms a display marking and which is completely enclosed at all illustrated distribution valves by a transparent plastic hood 11. At all illustrated valves, this plastic hood 11 is firmly connected to the adjusting spindle 4, so that it serves as an adjusting member for a manual adjusting of the adjusting spindle 4 and displaces upon a rotating of the spindle 4 axially together with the spindle relative to the parts of the distribution valve which are stationary relative to the housing. The transparent plastic hood 11 is equipped in the axial direction with a scale (not illustrated) for the flow rate, so that the respective position of the display rod 9 relative to the scale on the plastic hood 11, and thus, also the flow rate through the branch line 2 can be read from the outside.

In the distribution valves illustrated in the FIGS. 1–5, the valve seat body 6 is formed by the adjusting and measuring unit housing 13, which unites all main components of the adjusting and measuring unit 1 to one unit and is firmly connected to the distributor conduit 3 through a thread. By means of this, the advantage is arrived at that an exact alignment exists between the valve closing body 5 and the valve seat body 6 independent from possible manufacturing tolerances of the distributor conduit 3 and/or the branch line 2, and that the dimensional accuracy of these parts can be ensured in a simple manner, so that the desired control characteristics and leak tightness always are ensured.

As clearly can be seen, the valve gap is formed in all illustrated distribution valves by an immersing of the cone-shaped valve closing body 5 in the direction of flow S of the branch line 2 or flow channel 10, respectively, into the cylinder-shaped opening of the valve seat body 6. In the distribution valves illustrated in the FIGS. 1–5, the stationary adjusting and measuring unit housing 13, which forms in the distribution valve illustrated in the Figures the valve seat body 6, additionally extends from the valve gap in direction to the branch line 2, namely in the present embodiment precisely up to the branch line 2, where it at its front side contacts in a water pressure tight manner through a sealing by means of a O-ring the branch line 2. Obviously, also other kinds of the contact and sealing can be thought of, whereby, however, the illustrated front side variant has the advantage that it is relatively unproblematic with respect to deviations of the shape and the position of the structures involved. The inflow from the inflow line formed by the distributor conduit 3 to the valve gap formed by the valve closing body 5 and the valve seat body 6 proceeds at these distribution valves through four circular radial through openings 15 distributed uniformly on a common axial position along the circumference of the adjusting and measuring unit housing 13. The design illustrated in the FIGS. 1–5 leads to the advantage that a leakage flow from the distributor conduit 3 to the branch line 2, which would circumnavigate the valve gap and would lead in case of a closed valve to a leakage out of the branch line 2, is reliably prevented by the described sealing between the stationary structures 13, 2.

In the distribution valves illustrated in the FIGS. 3–6, the flow channel 10 is formed by that structure of the adjusting and measuring unit 1, which also forms the valve closing body 5. By this design, the walls which define the flow channel 10 in the area within which the flow against member 7 can be positioned during conventional operation by the forces of the flow and which, therefore, are of a special importance regarding the precision of the measuring, are formed by a structure of the adjusting and measuring unit 1, which leads to the advantage that a precise axial and also radial alignment is reached between the mentioned walls of the flow channel 10 and the flow against member 7 independently from possible manufacturing tolerances of the distributor conduit 3 and/or the branch line 2 in a simple manner, and that the preciseness regarding dimensions of these parts can be assured in a simple way, so that a higher preciseness regarding dimensions is ensured.

Furthermore, the adjusting spindle 4, the valve closing body 5 and the flow channel 10 are formed in the distribution valves illustrated in the FIGS. 3–6 by a one-piece injection molded plastic part, wherewith such distribution valves consist of relatively few individual parts or can be produced at especially low costs.

As clearly can be seen, the flow channel 10 of the valves illustrated in the FIGS. 3–6 is formed without exception by a free end of the cylinder shaped outer contour of the structure which also forms the valve closing body 5, whereby this free end projects axially into a corresponding cylinder-shaped bore hole in the branch line 2. In order to prevent a forming of a leakage flow from the valve gap to the exit of the branch line 2, which would circumnavigate the flow channel 10 and would, therefore, lead to a erroneous measuring, this free unit is sealed against the branch line 2 such that a rotation as well as also an axial translatoric movement of this free end is possibly without being detrimental to the sealing. In the valve variants illustrated in the FIGS. 3 and 6, this is reached by direct bordering of a sealing ring 16 located at the cylinder shaped outer contour of the free end at the wall of a cylinder shaped bore hole in the branch line 2. In the distribution valves of the FIGS. 4 and 5, however, the sealing is achieved indirectly, namely in that the free end is also sealed by a O-ring 16 (FIG. 4) or, however, by a sealing bead 17 (FIG. 5) made one-piece with same, against the stationary adjusting and measuring unit housing 13, which housing 13 is in turn sealed against the branch line 2.

In the distribution valves illustrated in the FIGS. 2–7, the inflow of the water coming from the valve gap into the entry area of the flow channel 10 proceeds through a plurality of radial openings 18 in the wall of the flow channel 10, which, seen in the direction of flow S, are located ahead of the flow against member 7 located, if no flow through the flow channel 10 is present, in its initial position. In the illustrated embodiment two or four, respectively radial openings 18, all with an identical cross-section and identical cross-sectional shape, are located on a common axial position uniformly along the circumference of the flow channel 10, whereby the distribution valves illustrated in the FIGS. 2–3 and 6–7 have circular radial openings 18 and the distribution valve illustrated in FIG. 5 has radial openings 18 with a substantially quadratically cross-section and rounded corners. This design leads to a especially uniform flow against the flow against member 7 in the flow channel 10, wherewith a stabilized and, therefore, good readability of the flow rate can be achieved.

Such as can be seen best in FIG. 6a, which shows an enlarged partial illustration of the distribution valve 6 in the opened state and subjected to a flow through the valve and in which the flow from the inflow conduit through the valve gap and into the flow channel 10 is represented by a plurality of arrows, the guiding of the flow occurs at all illustrated distribution valves in such a manner between the valve gap and the flow against member 7 that the flow is deflected twice after its exiting from the valve gap and prior to its impinging onto the flow against member 7, namely firstly in a first sense of rotation from a substantially vertical direction of flow into a first, substantially horizontal direction of flow, with which it enters the entry area of the flow channel 10, and thereafter in a second sense of rotation, which is opposite the first sense of rotation, into a second, again vertical direction of flow, in which direction it impinges onto the flow against member 7. Accordingly, the flow is deflected S-like between the valve gap and the flow against member 7, which also adds to an attenuation of the oncoming flow at the flow against member 7 with the already mentioned advantageous effects.

While preferred embodiments are described in the present application, it shall distinctly be understood that the invention is not restricted to same and may be otherwise practiced within the scope of the following claims.

The invention claimed is:

1. A distribution valve with flow meter for the use in the inlet of a hot water heating circuit, with a housing forming the inflow conduit, a branch line extending from the housing and an adjusting and measuring unit formed separately from the housing and arranged at the housing opposite the branch line and penetrating the housing wall, for the adjusting and displaying of a flow rate of a medium flowing through the branch line, wherein the adjusting and measuring unit comprises a valve closing body, which is operatively connected to an adjusting spindle in such a manner that it forms, together with a valve seat body which during conventional operation is stationary relative to the housing, a valve gap, which is adjustable by a rotating of the adjusting spindle for the adjusting of the flow rate, and wherein the adjusting and measuring unit includes a flow against member, which is located in a flow channel, through which in operation substantially the complete medium flowing off through the branch line flows, wherein the position of the flow against member in the flow channel is adjustable beginning from a starting position by a flow which flows from the valve gap to the branch line dependent from the flow rate, and wherein the flow against member is operatively connected to display means of the adjusting and measuring unit, which may be read off from the outside, in such a manner that different positions of the flow against member in the flow channel cause different displays of the display means, wherewith the respective flow rate through the branch line can be read at the valve at its outside, characterized in that the distribution valve is designed in such a manner that the flow exiting the valve gap during conventional operation is deflected prior to its impinging onto the flow against member at least twice, namely initially by a first sense of rotation in a first direction and thereafter by a second sense of rotation opposed to the first sense of rotation in a second direction.

2. The distribution valve according to claim 1, characterized in that the flow exiting the valve gap is deflected prior to its impinging onto the flow against member in each case by at least 45°.

3. The distribution valve according to claim 2, characterized in that the flow exiting the valve gap is deflected prior to its impinging onto the flow against member in each case by about 90°.

4. The distribution valve according to claim 1, characterized in that a housing section of the adjusting and measuring unit, which is stationary during conventional operation of the distribution valve, sealingly contacts a housing portion of the branch line which is stationary during the conventional use of the distribution valve.

5. The distribution valve according to claim 4, characterized in that said housing section of the adjusting and measuring unit contacts said housing portion of the branch line at its face end by sealing surfaces and/or by a seal.

6. The distribution valve according to claim 4, characterized in that the structural member, which forms the walls defining the flow channel at least in the area in which the flow against member can be positioned by the flow during conventional operation, is arranged at least in part inside of said stationary housing section of the adjusting and measuring unit, and that this structural member and the stationary housing section are designed in such a manner and/or sealing elements are arranged between them in such a manner, that a forming of a leakage flow from the valve gap to the exit of the branch line by bypassing the flow channel is reliably prevented.

7. The distribution valve according to claim 4, characterized in that the stationary housing section of the adjusting and measuring unit comprises radial or half-axial through-flow openings through which the medium can flow from the inflow conduit to the valve gap.

8. The distribution valve according to claim 1, characterized in that the valve seat body is formed by a structural member of the adjusting and measuring unit.

9. The distribution valve according to claim 1, characterized in that the walls defining the flow channel, at least within the area in which the flow against member can be positioned by the flow during the conventional operation, are formed by a housing section of the adjusting and measuring unit.

10. The distribution valve according to claim 1, characterized in that the structural member, which forms the walls defining the flow channel, at least in the area in which the flow against member can be positioned by the flow during conventional operation, projects into the branch line.

11. The distribution valve according to claim 10, characterized in that said structural member and the branch line are designed in such a manner and/or sealing elements are present between them in such a manner, that a formation of a leakage flow from the valve gap to the exit of the branch line reliably is prevented.

12. The distribution valve according to claim 1, characterized in that the distribution valve is designed in such a manner that the flow flowing during conventional operation from the valve gap to the flow channel enters the flow channel through several radial openings in the wall of the flow channel ahead of the flow against member seen in the direction of flow.

13. The distribution valve according to claim 12, characterized in that the radial openings are respectively uniformly distributed at the circumference of the flow channel.

14. The distribution valve according to claim 13, characterized in that said radial openings are distributed along a common axial position, at the circumference of the flow channel.

15. The distribution valve according to claim 13, characterized in that exactly two or exactly four radial openings are present.

16. The distribution valve according to claim 1, characterized in that the distribution valve is designed in such a manner that the valve gap is formed by a concentric immersion of a conically shaped body of the valve closing body into a bore of the valve seat body, so that the valve gap, seen in the direction of flow, is a circular ring shaped gap of which the width of the gap decreases with a increasing immersing of the valve closing body into the bore of the valve seat body until it has a minimal value or amounts to zero.

17. The distribution valve according to claim 16, characterized in that said conically shaped body of the valve closing body immerses into said bore of the valve seat body in the direction of the through flow of the branch line.

18. The distribution valve according to claim 1, characterized in that the cross-section of the flow channel broadens in the direction of flow in the area in which the flow against member may be positioned at conventional operation by the flow flowing in same.

19. The distribution valve according to claim 1, characterized in that the adjusting spindle, the valve closing body and the flow channel are formed by an one-piece component.

20. The distribution valve according to claim 19, characterized in that said one-piece component is an one-piece injection molded part of a plastic material.

21. The distribution valve according to claim 1, characterized in that the display means comprise a display rod, operated by the flow against member, and an adjusting member for a manual operating of the adjusting spindle, which completely encloses the outwards oriented free end of the display rod and is at least partly transparent for allowing a reading off of the respective position of the display rod and thereby of the flow rate through the branch line.

22. The distribution valve according to claim 21, characterized in that the adjusting member is rigidly connected to the adjusting spindle.

23. The distribution valve according to claim 22, characterized in that the adjusting spindle and the adjusting member are formed by a one-piece component.

24. The distribution valve according to claim 23, characterized in that said one-piece component is of a transparent plastic material.

25. A distribution arrangement, comprising at least two distribution valves according to claim 1.

26. An adjusting and measuring unit for the distribution valves or the distribution arrangement according to claim 1.

27. A distribution valve with flow meter for the use in the inlet of a hot water heating circuit, with a housing forming the inflow conduit, a branch line extending from the housing and arranged at the housing opposite the branch line and penetrating the housing wall for the adjusting and displaying of a flow rate of a medium flowing through the branch line, wherein the adjusting and measuring unit comprises a valve closing body, which is operatively connected to an adjusting spindle in such a manner that it forms, together with a valve seat body which during conventional operation is stationary relative to the housing, a valve gap which is adjustable by a rotating of the adjusting spindle for the adjusting of the flow rate, and wherein the adjusting and measuring unit includes a flow against member, which is located in a flow channel through which in operation substantially the complete medium flowing off through the branch line flows, wherein the position of the flow against member in the flow channel is adjustable beginning from a starting position by a flow which flows from the valve gap to the branch line dependent from the flow rate; and wherein the flow against member is operatively connected to display means of the adjusting and measuring unit which may be read from the outside in such a manner that different positions of the flow against member in the flow channel cause different displays at the display means, wherewith the respective flow rate through the branch line can be read at the valve at the outside, characterized in that a housing section of the adjusting and measuring unit, which is stationary during conventional operation of the distribution valve, sealingly contacts a housing portion of the branch line which is stationary during the conventional use of the distribution valve.

28. The distribution valve according to claim 27, characterized in that said housing section of the adjusting and measuring unit contacts said housing portion of the branch line at its face end by sealing surfaces and/or by a seal.

29. The distribution valve according to claim 27, characterized in that said housing section of the adjusting and measuring unit contacts said housing portion of the branch line at its face end by sealing surfaces and/or by a seal.

30. The distribution valve according to claim 27, characterized in that the structural member, which forms the walls defining the flow channel at least in the area in which the flow against member can be positioned by the flow during conventional operation, is arranged at least in part inside of the stationary housing section of the adjusting and measuring unit, and that this structural member and the stationary housing section are designed in such a manner and/or sealing elements are arranged between them in such a manner, that a forming of a leakage flow from the valve gap to the exit of the branch line by bypassing the flow channel is reliably prevented.

31. The distribution valve according to claim 27, characterized in that the stationary housing section of the adjusting and measuring unit comprises radial or half-axial through-flow openings through which the medium can flow from the inflow conduit to the valve gap.

32. The distribution valve according to claim 27, characterized in that the valve seat body is formed by a structural member of the adjusting and measuring unit.

33. The distribution valve according to claim 27, characterized in that the walls defining the flow channel, at least within the area in which the flow against member can be positioned by the flow during the conventional operation, are formed by a housing section of the adjusting and measuring unit.

34. The distribution valve according to claim 27, characterized in that the structural member, which forms the walls defining the flow channel, at least in the area in which the flow against member can be positioned by the flow during conventional operation, projects into the branch line.

35. The distribution valve according to claim 34, characterized in that said structural member and the branch line are designed in such a manner and/or sealing elements are present between them in such a manner, that a formation of a leakage flow from the valve gap to the exit of the branch line reliably is prevented.

36. The distribution valve according to claim 27, characterized in that the distribution valve is designed in such a manner that the flow flowing during conventional operation from the valve gap to the flow channel enters the flow channel through several radial openings in the wall of the flow channel ahead of the flow against member (7) seen in the direction of flow.

37. The distribution valve according to claim 36, characterized in that the radial openings are respectively uniformly distributed at the circumference of the flow channel.

38. The distribution valve according to claim 37, characterized in that the radial openings are distributed at a common axial position.

39. The distribution valve according to claim 36, characterized in that exactly two or exactly four radial openings are present.

40. The distribution valve according to claim 27, characterized in that the distribution valve is designed in such a manner that the valve gap is formed by a concentric immersion of a conically shaped body of the valve closing body into a bore of the valve seat body, so that the valve gap, seen in the direction of flow, is a circular ring shaped gap of which the width of the gap decreases with an increasing immersing of the valve closing body into the bore of the valve seat body until it has a minimal value or amounts to zero.

41. The distribution valve according to claim 40, characterized in that said conically shaped body of the valve closing body immerses into said bore of the valve seat body in the direction of the through flow of the branch line.

42. The distribution valve according to claim 27, characterized in that the cross-section of the flow channel broadens in the direction of flow in the area in which the flow against member may be positioned at conventional operation by the flow flowing in same.

43. The distribution valve according to claim 27, characterized in that the adjusting spindle, the valve closing body and the flow channel are formed by an one-piece component.

44. The distribution valve according to claim 43, characterized in that said one-piece component is an one-piece injection molded part of a plastic material.

45. The distribution valve according to claim 27, characterized in that the display means comprise a display rod, operated by the flow against member, and an adjusting member for a manual operating of the adjusting spindle, which completely encloses the outwards oriented free end of the display rod and is at least partly transparent for allowing a reading off of the respective position of the display rod and thereby of the flow rate through the branch line.

46. The distribution valve according to claim 45, characterized in that the adjusting member is rigidly connected to the adjusting spindle.

47. The distribution valve according to claim 46, characterized in that the adjusting spindle and the adjusting member are formed by a one-piece component.

48. The distribution valve according to claim 47, characterized in that said one-piece component is of a transparent plastic material.

49. A distribution arrangement, comprising at least two distribution valves according to claim 27.

50. An adjusting and measuring unit for the distribution valves or the distribution arrangement according to claim 27.

* * * * *

UNITED STATES PATENT AND TRADEMARK OFFICE
CERTIFICATE OF CORRECTION

PATENT NO. : 7,036,786 B1  
APPLICATION NO. : 10/672273  
DATED : May 2, 2006  
INVENTOR(S) : Schura Page 1 of 1

It is certified that error appears in the above-identified patent and that said Letters Patent is hereby corrected as shown below:

In column 5, line 5:
  -- substantially perpendicular, [ah] each fitting assembly [fiber] further--

In column 6, line 11:
  --understructure, the understructure has a shape adapted--

Signed and Sealed this

Twelfth Day of September, 2006

JON W. DUDAS  
*Director of the United States Patent and Trademark Office*